(12) United States Patent
Leblanc et al.

(10) Patent No.: US 12,398,752 B2
(45) Date of Patent: Aug. 26, 2025

(54) BEARING DEVICE AND METHOD FOR DETERMINING A LOAD ON THE BEARING DEVICE

(71) Applicant: AKTIEBOLAGET SKF, Gothenburg (SE)

(72) Inventors: James P. Leblanc, Luleå (SE); Patrik Pääjärvi, Södra Sunderbyn (SE)

(73) Assignee: AKTIEBOLAGET SKF, Gothenburg (SE)

( * ) Notice: Subject to any disclaimer, the term of this patent is extended or adjusted under 35 U.S.C. 154(b) by 187 days.

(21) Appl. No.: 18/323,955

(22) Filed: May 25, 2023

(65) Prior Publication Data

US 2023/0417612 A1  Dec. 28, 2023

(30) Foreign Application Priority Data

Jun. 28, 2022 (DE) .................. 102022206537.9

(51) Int. Cl.
*F16C 19/52* (2006.01)
*G01B 11/16* (2006.01)
*G01L 1/24* (2006.01)
*G01M 13/04* (2019.01)

(52) U.S. Cl.
CPC .......... *F16C 19/522* (2013.01); *G01B 11/165* (2013.01); *G01L 1/246* (2013.01); *G01M 13/04* (2013.01)

(58) Field of Classification Search
CPC ..... F16C 19/522; G01B 11/16; G01B 11/165; G01L 1/246; G01M 13/04
See application file for complete search history.

(56) References Cited

U.S. PATENT DOCUMENTS

2012/0328232 A1\* 12/2012 Reedman ............. G02B 6/0208
385/12
2013/0004117 A1\* 1/2013 Reedman ................ G01L 1/246
385/12

(Continued)

OTHER PUBLICATIONS

Mayassa Hajar, "Contribution of Random Sampling in the Context of Rotating Machinery Diagnostic", May 23, 2019, pp. 1-161, Signal and Image Processing, Université de Lyon, France, Université Libanaise, Lebanon.

(Continued)

*Primary Examiner* — Phillip A Johnson
(74) *Attorney, Agent, or Firm* — J-TEK LAW PLLC; Scott T. Wakeman; Mark A. Ussai (57) ABSTRACT

A bearing device includes a bearing having an inner ring and an outer ring, at least one of the inner and outer rings being capable of rotating concentrically relative to the other ring. A fiber optic sensor includes an array of optical strain gauges mounted on the inner ring or on the outer ring of the bearing and an optical interrogator is configured to measure the deformations of the inner ring or the outer ring from the optical strain gauges. A command device commands the optical interrogator, a first determining device determines a statistical parameter from random samples of measurements, and a second determining device determines the load acting on the bearing from the statistical parameter and a predetermined relationship between the statistical parameter and the load.

10 Claims, 4 Drawing Sheets

(56) References Cited

U.S. PATENT DOCUMENTS

2013/0188897 A1* 7/2013 Reedman ........... G01D 5/35303
　　　　　　　　　　　　　　　　　　　　　　　384/445
2021/0088393 A1* 3/2021 Båstedt ................ G01L 5/0009

OTHER PUBLICATIONS

Karabacak et al., "High-speed System for FBG-based Measurements of Vibration and Sound", May 2016, pp. 2-11, Fiber Optic Sensors and Application XIII, vol. 9852.
Manuel P. Fernández, "High-speed and high-resolution interrogation of FBG sensors using wavelength-to-time mapping and Gaussian filters", Dec. 9, 2019, Optics Express, vol. 27, No. 25, © 2019 Optical Society of America.

* cited by examiner

BEARING DEVICE AND METHOD FOR DETERMINING A LOAD ON THE BEARING DEVICE

CROSS-REFERENCE

This application claims priority to German patent application no. 102022206537.9 filed on Jun. 28, 2022, the contents of which are fully incorporated herein by reference.

BACKGROUND OF THE INVENTION

The present invention relates to bearings, and more particularly to a bearing device and a method for determining a load acting on the bearing device.

Previously, an optical sensing system has been implemented in a bearing to measure a load applied on the bearing. Such an optical sensing system includes an optical interrogator device and an optic fiber surrounding the outer ring of the bearing. The optical interrogator emits a laser signal into the optic fiber, and receives a reflected signal corresponding to the deformation of the outer ring of the bearing.

The wavelength of the reflected signal enables a determination of the deformation of the outer bearing and ultimately the load applied on the bearing. The optical interrogator generates samples of the reflected wavelengths from the fiber, which enable deformation measurements.

In typical usage, the sampling speed of the optical interrogator limits the maximum rotating speed due to the requirement of observing the Nyquist sampling criterion to be able to determine the deformations from the reflected signals by waveform analysis of the reflected signal with known time-domain or frequency domain techniques. However, as the sampling frequency of the optical interrogator is low, generally limited to 2500 Hz, any measured signal due to the rotation of the bearing is limited to 1250 Hz according to the Nyquist sampling criterion.

SUMMARY OF THE INVENTION

The present invention is directed to determining the loads applied on bearings rotating at a rotating frequency disregarding the Nyquist sampling criterion.

According to an aspect, a method for determining a load acting on a bearing device is proposed. The bearing device comprises a bearing including an inner ring and an outer ring capable of rotating concentrically relative to each other and a fiber optic sensor including an array of optical strain gauges mounted on the inner ring or on the outer ring of the bearing. The method comprises the steps of:
  measuring the deformations of the inner ring or of the outer ring of the bearing from the optical strain gauges at a random time interval to obtain random samples of measurements,
  determining a statistical parameter from the random samples of measurements, and
  determining the load acting on the bearing from the statistical parameter and a predetermined relationship between the statistical parameter and the load.

The method for determining a load acting on the bearing device implements a random sampling method having a lower frequency than required by Nyquist sampling requirements so that optical interrogators of the state of the art may be implemented, for example for a rotating frequency of the bearing which generates measurement signals with frequencies greater than 1250 Hz. The randomness of sampling decouples the sample values from the machine's rotation speed.

Preferably, each optical strain gauge includes a different set of refraction gratings and the step of measuring the deformation of the inner ring or of the outer ring includes:
  a) determining an array in which the optical strain gauges are ranked to define a sequence of reception of reflected wavelengths by the optical strain gauges,
  b) emitting at the random time interval an optical signal into the optical fiber to illuminate the set of refraction gratings of the optical strain gauges,
  c) for each emission of the optical signal into the optical fiber, collecting the reflected wavelengths of a set of refraction gratings of the current optical strain gauge defined in the sequence, and
  d) repeating steps b) and c), and collecting the reflected wavelength of the optical strain gauge following the current optical strain gauge defined in the sequence for as long as one ring of the inner and outer rings rotates relative to the other ring of the inner and outer rings.

Most preferably, each optical strain gauge includes a different set of refraction gratings and the step of measuring the deformation of the outer ring includes:
  e) determining an array in which the optical strain gauges are ranked to define a sequence of reception of reflected wavelengths by the optical strain gauges,
  f) emitting an optical signal into the optical fiber to illuminate the set of refraction gratings of the optical strain gauges,
  g) for each emission of the optical signal into the optical fiber, collecting the reflected wavelengths of a set of refraction gratings of an optical strain gauge randomly chosen in the sequence,
  h) repeating steps f) and g) for as long as one ring of the inner and outer rings rotates relative to the other ring of the inner and outer rings.

Preferably, the statistical parameter is a higher order moment beyond $2^{nd}$ order, the method further comprises a step of determining the predetermined relationship between the statistical parameter and the load, the determination of the relationship comprises:
  defining a model of the bearing,
  applying predetermined loads on the model of the bearing,
  for each predetermined load, collecting the deformations of the inner ring or the outer ring of the modelled bearing and determining the statistical parameter of the deformations, each predetermined load and the associated statistical parameter forming a couple of points,
  determining a curve fitting the couples of points, the relationship comprising the curve.

Advantageously, the step of determining the load acting on the bearing includes determining the load from the curve and the statistical parameter.

Preferably, the statistical parameter comprises a probability density function of the deformations and the method further comprises a step of determining the relationship between the statistical parameter and the load. Such a determination of the relationship preferably includes:
  defining a model of the bearing,
  applying predetermined loads on the model of the bearing, and
  for each predetermined load, collecting the deformations of the outer ring of the modelled bearing and determining a reference probability density function of the deformations to obtain a set of reference probability density functions of the deformations, the relationship linking each reference probability density function of the set of deformations to the associated predetermined load.

Advantageously, the step of determining the load acting on the bearing includes:

comparing the probability density function of the deformations to the reference probability density functions, and determining a target probability density function of the reference probability density functions fitting the probability density function of the deformations with a tolerance value, the load acting on the bearing being equal to the predetermined load associated to the determined target probability density function.

According to another aspect of the present invention, a bearing device is proposed. Such a bearing device preferably comprises:

a bearing including an inner ring and an outer ring capable of rotating concentrically relative to each other, a fiber optic sensor comprising an array of optical strain gauges mounted on the inner ring or on the outer ring of the bearing, an optical interrogator configured to measure the deformations of the inner ring or of the outer ring from the optical strain gauges, command means configured to command the optical operator so that the deformations of the inner ring or of the outer ring are measured at a random time interval to obtain random samples of measurements, first determining means configured to determine a statistical parameter from the random samples of measurements, and second determining means configured to determine the load acting on the bearing from the statistical parameter and a predetermined relationship between the statistical parameter and the load.

Preferably, the statistical parameter is a higher order moment beyond the $2^{nd}$ order moment, the second determining means further comprising a memory configured to save a curve fitting pairs of points, each pair of points comprising a predetermined load and an associated statistical parameter of deformations of the outer ring of a model of the roller bearing, the deformations resulting from the application of the predetermined load on the model of the bearing.

Advantageously, the statistical parameter includes a probability density function of the deformations, the second determining means further includes a memory configured to save reference probability density functions of deformations and associated predetermined loads, each reference probability density function of deformations being determined from deformations of the outer ring of a model of the roller bearing, the deformations resulting from the application of the associated predetermined load on the model of the roller bearing.

BRIEF DESCRIPTION OF THE SEVERAL VIEWS OF THE DRAWINGS

Other advantages and features of the invention will appear on examination of the detailed description of embodiments, in no way restrictive, and the appended drawings in which.

DETAILED DESCRIPTION OF THE INVENTION

Figure 1:
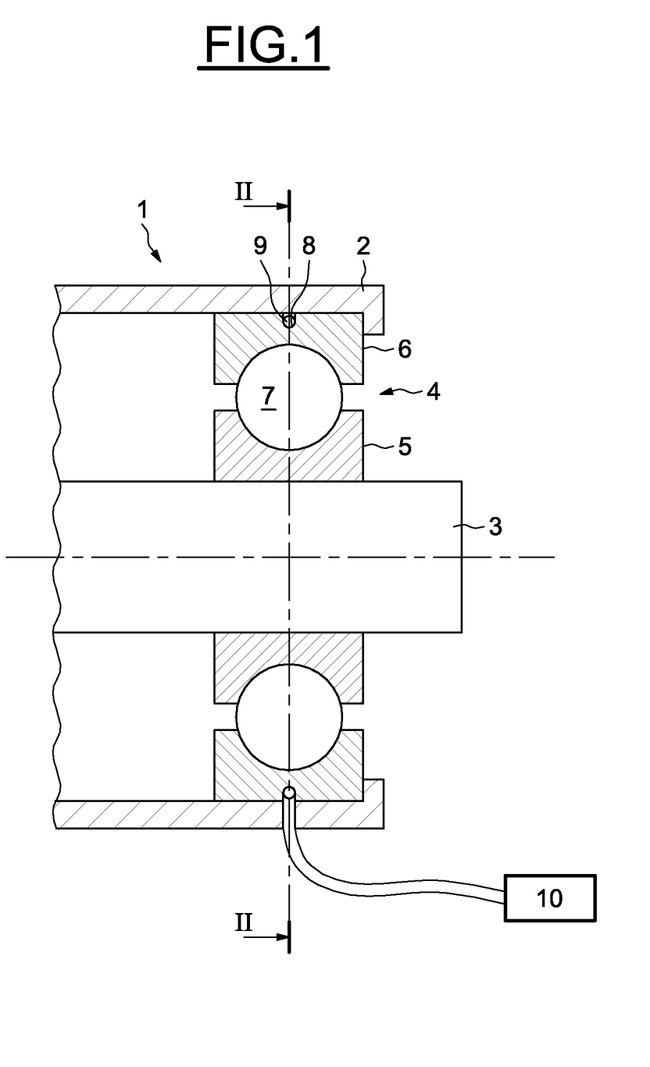
FIG. 1 illustrates schematically a rotating machine according to the invention.

Reference is made to FIG. 1, which schematically represents a partial longitudinal cross section of a rotating machine 1. The rotating machine 1 comprises a housing 2 and a shaft 3 supported in the housing 2 by a roller bearing 4. The roller bearing 4 includes an inner ring 5 mounted on the shaft 3 and an outer ring 6 mounted within the bore of the housing 2. The outer ring 6 radially surrounds or is disposed around the inner ring 5. The inner and outer rings 5, 6, respectively, rotate concentrically relative to one another; that is, one of the bearing rings 5, 6, or even both bearing rings 5, 6, rotate(s) relative to the other ring 6, 5 about a central axis (not indicated).

The roller bearing 4 is further provided with a row of rolling elements 7 radially interposed or disposed between inner and outer raceways of the inner and outer rings 5, 6. In the illustrated example, the rolling elements 7 are balls. Alternatively, the roller bearing 4 may comprise other types of rolling elements 7, for example cylindrical or tapered rollers, needles, etc. In the illustrated example, the roller bearing 4 includes one row of rolling elements 7. Alternatively, the roller bearing 4 comprise may include two or more rows of rolling elements 7.

An annular groove 8 is formed on the outer surface of the outer ring 6. The groove 8 is radially oriented outwardly. The groove 8 radially faces the bore of the housing 2.

An optical fiber 9 is housed or disposed within the groove 8 of the outer ring 6. The optical fiber 9 is connected to a monitoring device 10. In the illustrated example, the optical fiber 9 is mounted on the outer ring 6. Alternatively, the optical fiber 9 may be mounted on the inner ring 5.

Figure 2:
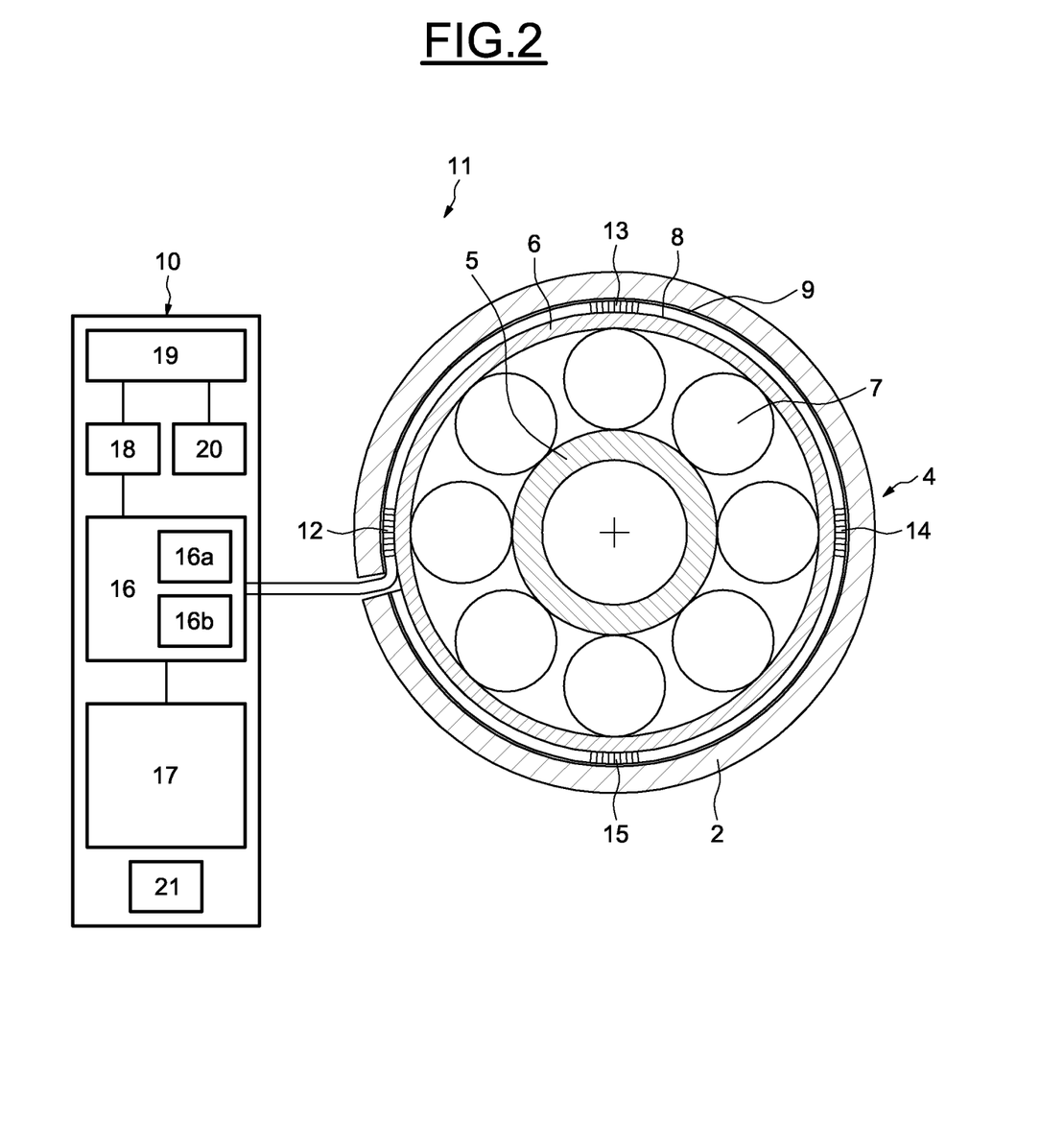
FIG. 2 is a cross-section along axis II-II of FIG. 1.

FIG. 2 illustrates an example of a bearing device 11 comprising the roller bearing 4 and the monitoring device 10. The optical fiber 9 comprises optical strain gauges 12, 13, 14, 15 mounted within the groove 8 of the outer ring 6. In the illustrated example, the optical fiber 9 comprises four optical strain gauges 12, 13, 14, 15. However, the optical fiber 9 may alternatively include less than, or more than, four optical strain gauges.

Each optical strain gauge 12, 13, 14, 15 includes a different set of refraction gratings, for example a set of Bragg refraction gratings. When the optical strain gauges 12, 13, 14, 15 are illuminated by an optical signal, for example emitted by a laser, each set of refraction gratings reflects a part of the optical signal. Each reflected signal by the optical strain gauges 12, 13, 14, 15 has a different wavelength so that the reflected signal emitted by each one of the optical strain gauges 12, 13, 14, 15 may be identified. When a load is applied to the bearing 4, the optical fiber 9 is stretched or compressed so that the reflected wavelength changes.

Preferably, the monitoring device 10 comprises an optical interrogator 16 connected to the optical fiber 9 and configured to measure the deformations of the outer ring 6 of the roller bearing 4 from the optical strain gauges 12, 13, 14, 15. The optical interrogator 16 includes an optical signal transmitter 16a, for example a laser, and an optical receiver 16b.

Further, the monitoring device 10 preferably also comprises command means 17 connected to the optical interrogator 16, first determining means 18 connected to the optical interrogator 16, second determining means 19 connected to the first determining means 18, and a memory 20 connected to the second determining means 19.

The monitoring device 10 also further comprises a processing unit 21 configured to implement the optical interrogator 16, the command means 17, the first determining means 18, the second determining means 19, and the memory 20.

Figure 3:
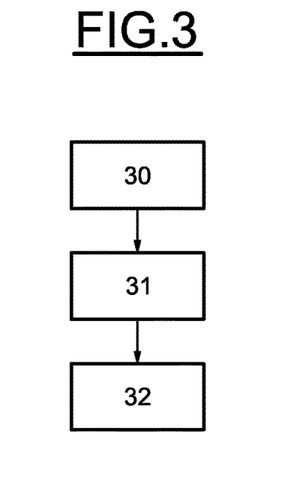
FIG. 3 illustrates schematically a first example of a method for determining a load acting on the bearing device according to the invention.

FIG. 3 illustrates a first example of a method for determining a load acting on the bearing device 11. In a step 30, the optical interrogator 16 measures the deformations of the outer ring 6 of the roller bearing 4 from the optical strain gauges 12, 13, 14, 15 at a random time interval to obtain random samples of measurements.

An array X in which the optical strain gauges are ranked to define a sequence of reception of reflected wavelengths by the optical strain gauges is defined. For example, the array X may be as follows:

X=[G12,G13,G14,G15]

wherein G12, G13, G14, G15 are the identification numbers of the optical strain gauges 12, 13, 14, 15, respectively. The array X is stored in the optical interrogator 16.

The command means 17 include a random generator generating random time intervals and command the optical signal transmitter 16a of the optical interrogator 16 so that an optical signal is emitted at random time intervals into the optical fiber 9 to illuminated the set of refraction gratings of the optical strain gauges 12, 13, 14, 15.

Following each emission of the optical signal by the optical signal transmitter 16a, the optical signal receiver 16b collects the reflected wavelength of a set of refraction gratings of the current optical strain gauge defined in the sequence defined in array X as long as the inner ring rotates relative to the outer ring, the current optical strain gauge being the next strain gauge in the array X.

For example, after an emission of the optical signal in the fiber 9, the optical signal receiver 16b collects the reflected wavelengths of a set of refraction gratings of the strain gauge 12 identified by the identification number G12. Then, after the next emission of the optical signal in the fiber 9, the optical signal receiver 16b collects the reflected wavelength of a set of refraction gratings of the strain gauge 13 identified by the identification number G13.

In a variant, the optical signal transmitter 16a emits the optical signal in the fiber 9 at random or constant time intervals. In another variant, the optical signal transmitter 16a emits the optical signal in the fiber 9 with random permutations of strain gauge query sequences.

Following each emission of the optical signal by the optical signal transmitter 16a, the optical signal receiver 16b collects the reflected wavelengths of a set of refraction gratings of an optical strain gauge defined in array X, the optical strain gauge being chosen randomly by the command means 17. The deformation values determined by the optical interrogator 16 from the optical signals received by the optical signal receiver 16b form the random samples of measurements.

In a step 31, the first determining means 18 determine a statistical parameter from the random samples of measurements. The statistical parameter comprises a higher order moment beyond $2^{nd}$ order of the random samples of measurements, for example, the skew or the kurtosis of the random samples of measurements.

It is assumed that the statistical parameter comprises the skew of the random samples of measurements. It is also assumed that the memory 20 comprises a predetermined relationship between the skew and the load.

Figure 4:
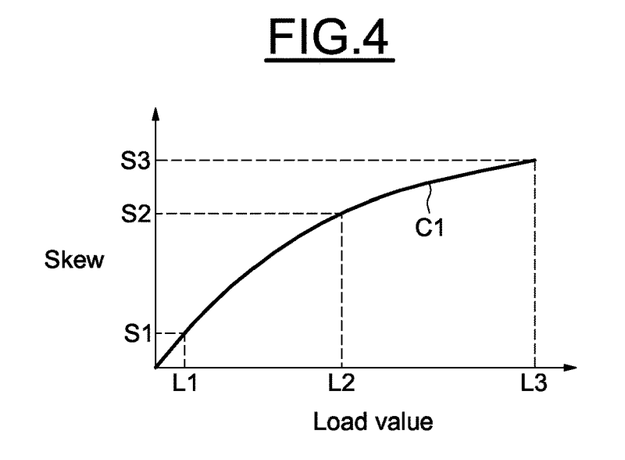
FIG. 4 illustrates schematically a first example of a predetermined relationship between the load applied on the bearing and a statistical parameter according to the invention.

FIG. 4 illustrates an example of the predetermined relationship between the skew of the random samples of measurements and the load. The relationship comprises three pairs of points (L1, S1), (L2, S2) and (L3, S3), and a curve C1 fitting the three pairs of points.

The determination of the three pairs of points (L1, S1), (L2, S2) and (L3, S3) is explained below. In this example, the first relationship links the skew to the load, the load being the load applied on the bearing 4.

In step 32, the second determining means 19 determine the load acting on the bearing from the skew of the random samples of measurements and the curve C1. The steps 31 and 32 are repeated as soon as a new deformation value is measured by the optical interrogator 16.

Figure 5:
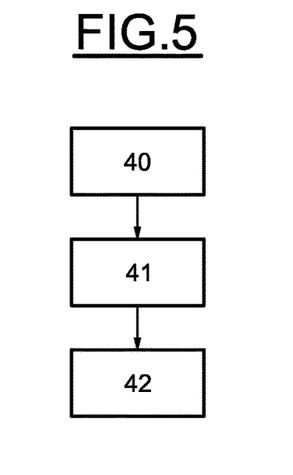
FIG. 5 illustrates schematically an example of a method to determine the first example of the predetermined relationship between the load applied on the bearing and the statistical parameter according to the invention.

FIG. 5 illustrates an example of a method to determine the predetermined relationship between the load applied on the bearing 4 and the statistical parameter comprises the skew of the random samples of measurements. In a first step 40, a model of the roller bearing 4 is defined. The model may be a finite element mode of the bearing 4.

In step 41, predetermined loads are applied on the model for different relative positions of the inner ring and the outer ring. For example, the load L1 is applied on the model of the bearing 4 and the deformations of the outer ring of the model are measured for different relative positions.

Then, the load L2 is applied on the model of the bearing 4 and the deformations of the outer ring of the model are measured for different relative positions, and then the load L3 is applied on the model of the bearing 4 and the deformations of the outer ring of the model are measured for different relative positions.

In step 41, for each predetermined load L1, L2, L3, the statistical parameter is determined from the deformations associated to the predetermined load. The skews S1, S2, S3 are determined.

In step 42, the curve C1 is determined so that the curve C1 passes through the pairs of points (L1, S1), (L2, S2) and (L3, S3).

Figure 6:
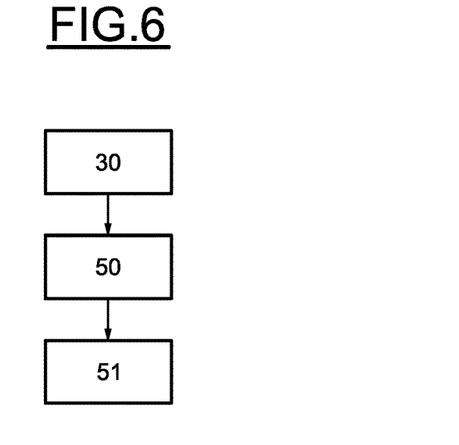
FIG. 6 illustrates schematically a second example of the predetermined relationship between the load applied on the bearing and a statistical parameter according to the invention.

FIG. 6 illustrates a second example of a method for determining a load acting on the bearing device 11. The method begins with step 30 as defined above. In step 50, the first determining means 18 determine a statistical parameter from the random samples of measurements. The statistical parameter comprises a probability density function of the random samples of measurements. It is also assumed that the memory 20 comprises a second predetermined relationship between the probability density function of the random samples of measurements and the load.

Figure 7:
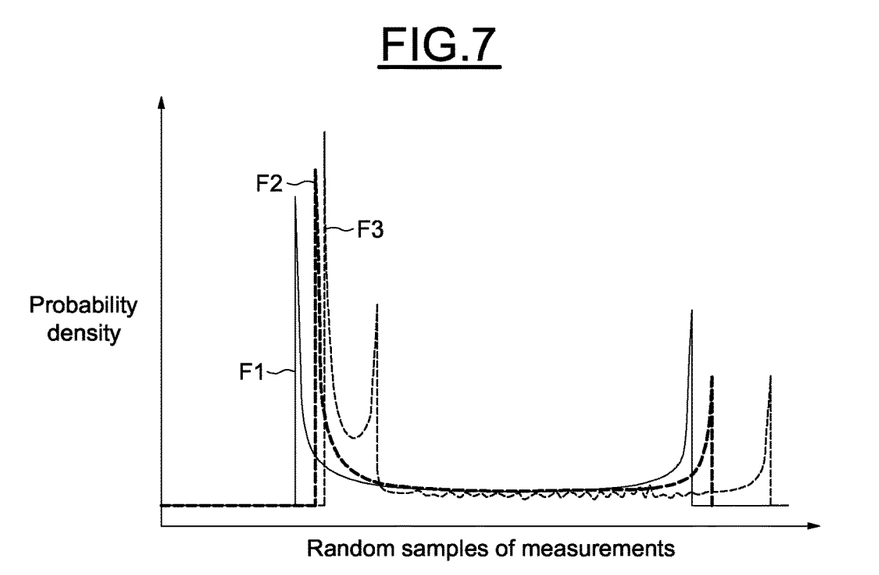
FIG. 7 illustrates schematically a second example of the predetermined relationship between the load applied on the bearing and a statistical parameter according to the invention.

FIG. 7 illustrates an example of the second predetermined relationship. The second predetermined relationship comprises a set of reference probability density functions of the deformations. Each reference probability density function F1, F2, F3 of the deformations or random samples of measurements is associated to a load value L4, L5, L6 applied on the bearing. For example, the reference probability density function F1, F2, F3 is associated to the load value L4, L5, L6.

In step 51, the second determining means 19 determine the load acting on the bearing 4 from the probability density function of the random samples of measurements and the set of reference probability density functions F1, F2, F3 of the deformations. The second determining means 19 compare the probability density function of the deformations to the reference probability density functions, and determine a target probability density function of the reference probability density functions fitting the probability density function of the deformations with a tolerance value.

Then, the second determining means 19 determine the load value L4, L5, L6 associated to the target probability density function, the load applied on the bearing 4 being equal to the determined load value L4, L5, L6. The steps 50, and 51 are repeated as soon as a new deformation value is measured by the optical interrogator 16.

Figure 8:
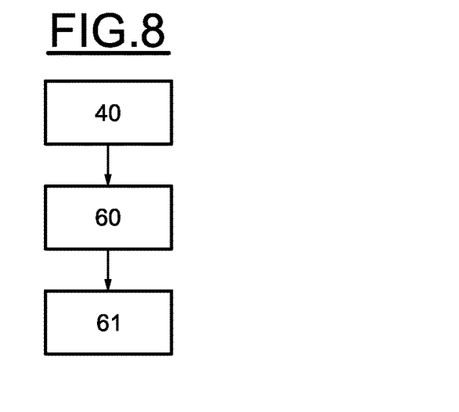
FIG. 8 illustrates schematically an example of a method of determining the second example of the relationship between the load applied on the bearing and the statistical parameter according to the invention.

FIG. 8 illustrates an example of a method of determining the second predetermined relationship. The method begins with step 40 as defined above.

In step 60, predetermined loads are applied on the model for different relative positions of the inner ring and the outer ring. For example, the load L4 is applied on the model of the bearing 4 and the deformations of the outer ring of the model are measured for different relative positions.

Then, the load L5 is applied on the model of the bearing 4 and the deformations of the outer ring of the model are measured for different relative positions. Then the load L6 is applied on the model of the bearing 4 and the deformations of the outer ring of the model are measured for different relative positions.

In step 61, for each predetermined load L4, L5, L6, the reference probability density function F1, F2, F3 is determined from the deformations associated to the predetermined load.

The method for determining a load acting on the bearing device implements a random sampling method having a lower frequency than required by Nyquist sampling requirements so that optical interrogators of the state of the art may be implemented for example for a rotating frequency of the bearing 4 when generating measurement signals greater than 1250 Hz. The randomness of sampling decouples the sample values from the machine's rotational speed.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

We claim:

1. A method for determining a load acting on a bearing device, the bearing device including a bearing having an inner ring and an outer ring capable of rotating concentrically relative to each other and a fiber optic sensor including an array of optical strain gauges mounted on the bearing inner ring or on the bearing outer ring, the method comprising the steps of:
   measuring the deformations of the inner ring or the outer ring from the optical strain gauges at a random time interval to obtain random samples of measurements;
   determining a statistical parameter from the random samples of measurements; and
   determining the load acting on the bearing from the statistical parameter and a predetermined relationship between the statistical parameter and the load.

2. The method according to claim 1, wherein each optical strain gauge includes a different set of refraction gratings, and wherein the step of measuring the deformation of the inner ring or the outer ring includes the substeps of:
   a) determining the array of optical strain gauges in which the optical strain gauges are ranked to define a sequence of reception of reflected wavelengths by the optical strain gauges;
   b) emitting an optical signal into the optical fiber at the random time interval so as to illuminate the set of refraction gratings of the optical strain gauges;
   c) for each emission of the optical signal into the optical fiber, collecting the reflected wavelengths of a set of refraction gratings of the current optical strain gauge defined in the sequence; and
   d) repeating substeps b) and c) and collecting the reflected wavelengths of the optical strain gauge following the current optical strain gauge defined in the sequence as long as one ring of the inner and outer rings rotates relative to the other ring of the inner and outer rings.

3. The method according to claim 1, wherein each optical strain gauge includes a different set of refraction gratings and the step of measuring the deformation of the outer ring includes the substeps of:
   e) determining the array of optical strain gauges in which the optical strain gauges are ranked to define a sequence of reception of reflected wavelengths by the optical strain gauges;
   f) emitting an optical signal into the optical fiber to illuminate the set of refraction gratings of the optical strain gauges;
   g) for each emission of the optical signal into the optical fiber, collecting the reflected wavelengths of a set of refraction gratings of an optical strain gauge randomly chosen in the sequence; and
   h) repeating steps f) and g) as long as one ring of the inner and outer rings rotates relative to the other ring of the inner and outer rings.

4. The method according to claim 1, wherein the statistical parameter is a higher order moment beyond $2^{nd}$ order and the method further comprises a step of determining the predetermined relationship between the statistical parameter and the load, the determination of the relationship comprising the substeps of:
- defining a model of the bearing;
- applying predetermined loads on the model of the bearing;
- for each predetermined load, collecting the deformations of the inner ring or of the outer ring of the modelled bearing and determining the statistical parameter of the deformations, each predetermined load and the associated statistical parameter forming a pair of points; and
- determining a curve fitting the pairs of points, the relationship comprising the curve.

5. The method according to claim 4, wherein the substep of determining the load acting on the bearing includes determining the load from the curve and the statistical parameter.

6. The method according to claim 1, wherein the statistical parameter includes a probability density function of the deformations and the method further comprises a step of determining the relationship between the statistical parameter and the load, the step of determining the relationship including the substeps of:
- defining a model of the bearing;
- applying predetermined loads on the model of the bearing; and
- for each predetermined load, collecting the deformations of the outer ring of the modelled bearing and determining a reference probability density function of the deformations to obtain a set of reference probability density functions of the deformations, the relationship linking each reference probability density function of the set of deformations to the associated predetermined load.

7. The method according to claim 6, wherein the step of determining the load acting on the bearing includes the substeps of:
- comparing the probability density function of the deformations to the reference probability density functions; and
- determining a target probability density function of the reference probability density functions fitting the probability density function of the deformations with a tolerance value, the load acting on the bearing being equal to the predetermined load associated to the determined target probability density function.

8. A bearing device comprising:
- a bearing including an inner ring and an outer ring, at least one of the inner and outer rings being configured to rotate concentrically relative to the other one of the inner and outer rings;
- a fiber optic sensor including an array of optical strain gauges mounted on the bearing inner ring or on the bearing outer ring;
- an optical interrogator configured to measure the deformations of the inner ring or of the outer ring from the optical strain gauges mounted on the one of the inner ring and the outer ring;
- command means configured to command the optical interrogator so that the deformations of the one of inner ring and the outer ring are measured at a random time interval to obtain random samples of measurements;
- a processing unit configured to determine a statistical parameter from the random samples of measurements and configured to determine the load acting on the bearing from the statistical parameter and a predetermined relationship between the statistical parameter and the load.

9. The bearing device according to claim 8, wherein:
the statistical parameter is a higher order moment greater than $2^{nd}$ order; and
the processing unit further includes a memory configured to save a curve fitting pairs of points, each pair of points including a predetermined load and an associated statistical parameter of deformations of the outer ring of a model of the bearing, the deformations resulting from the application of the predetermined load on the model of the bearing.

10. The bearing device according to claim 8, wherein:
the statistical parameter includes a probability density function of the deformations; and
the processing unit further includes a memory configured to save reference probability density functions of deformations and associated predetermined loads, each reference probability density function of deformations being determined from deformations of the outer ring of a model of the bearing, the deformations resulting from the application of the associated predetermined load on the model of the bearing.

* * * * *